United States Patent
Seberger et al.

(10) Patent No.: US 10,353,405 B2
(45) Date of Patent: Jul. 16, 2019

(54) AUTOMATIC CALIBRATION OF POSITION TRANSMITTER

(71) Applicant: FISHER CONTROLS INTERNATIONAL LLC, Marshalltown, IA (US)

(72) Inventors: Stephen G. Seberger, Marshalltown, IA (US); Jimmie L. Snowbarger, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 91 days.

(21) Appl. No.: 15/288,211

(22) Filed: Oct. 7, 2016

(65) Prior Publication Data

US 2017/0102717 A1    Apr. 13, 2017

Related U.S. Application Data

(60) Provisional application No. 62/239,829, filed on Oct. 9, 2015.

(51) Int. Cl.
  *G05B 19/042*    (2006.01)
  *G05D 7/06*    (2006.01)
  *G05B 19/402*    (2006.01)

(52) U.S. Cl.
  CPC ........... *G05D 7/06* (2013.01); *G05B 19/0425* (2013.01); *G05B 19/402* (2013.01); *G05B 2219/25312* (2013.01); *G05B 2219/33331* (2013.01)

(58) Field of Classification Search
  CPC ........ G05B 19/402; G05B 2219/25312; G05D 7/06
  See application file for complete search history.

(56) References Cited

U.S. PATENT DOCUMENTS 5,710,370 A * 1/1998 Shanahan ................. G01F 1/50
                                                                       73/1.35
6,279,870 B1 * 8/2001 Welz, Jr. ............. F16K 27/0218
                                                                       251/129.04

(Continued)

FOREIGN PATENT DOCUMENTS

WO    WO-99/50580 A1    10/1999
WO    WO-2014/066209 A1    5/2014

OTHER PUBLICATIONS

The International Search Report and the Written Opinion of the International Searching Authority, dated May 4, 2017, International Application No. PCT/US2016/055895 (8 pages).

(Continued)

*Primary Examiner* — Kenneth M Lo
*Assistant Examiner* — Michael J Huntley
(74) *Attorney, Agent, or Firm* — Marshall, Gerstein & Borun LLP

(57) ABSTRACT

A system and method using a valve controller to control a valve. The valve controller including a position controller for moving the valve and a transmitter for providing information about the position of the valve. A calibration table and/or chart based on calibration data of the position controller is generated to provide a transmitter output value, wherein the transmitter need not be separately calibrated. The calibration table and/or chart may be stored in the position controller and provided to the transmitter upon completion of the calibration of the position controller. Dual power supply circuitry may be configured wherein a first power source supplies power to both the position controller and the transmitter to facilitate automatic calibration of the transmitter even when only the position controller is powered.

15 Claims, 5 Drawing Sheets

(56) References Cited

U.S. PATENT DOCUMENTS

| | | | |
|---|---|---|---|
| 7,003,417 B2* | 2/2006 | Koukol, Jr. | G01F 25/00 |
| | | | 702/104 |
| 2003/0233203 A1* | 12/2003 | Grumstrup | G01F 1/24 |
| | | | 702/98 |
| 2004/0249592 A1* | 12/2004 | Koukol, Jr. | G01F 25/00 |
| | | | 702/88 |
| 2007/0183901 A1 | 8/2007 | Chester et al. | |
| 2008/0097652 A1 | 4/2008 | Koenig | |
| 2010/0188667 A1* | 7/2010 | Weatherbee | G01L 37/003 |
| | | | 356/614 |
| 2012/0278006 A1* | 11/2012 | Weatherbee | A61M 39/28 |
| | | | 702/44 |
| 2013/0042476 A1* | 2/2013 | Carter | F16K 31/122 |
| | | | 29/890.12 |
| 2014/0144530 A1* | 5/2014 | Miller | F15B 21/08 |
| | | | 137/551 |

OTHER PUBLICATIONS

Invitation to Pay Additional Fees and, Where Applicable, Protest Fees of the International Searching Authority, dated Jan. 25, 2017, International Application No. PCT/US2016/055895 (5 pages).

* cited by examiner

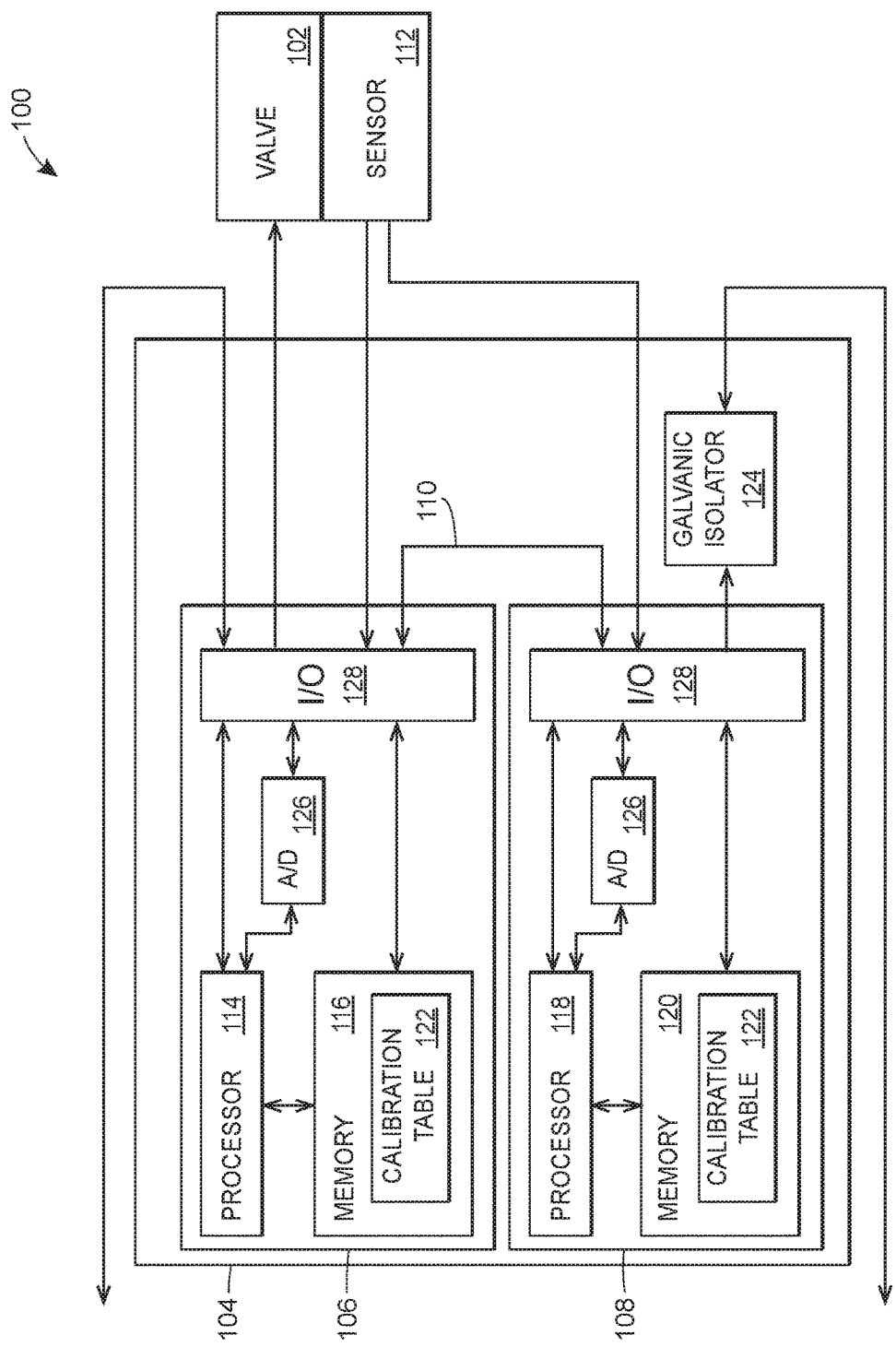

| Position Sensor Value | Transmitter Output Value | |
|---|---|---|
| | Non-linear | Linear |
| 0 | 506 | 504 |
| 2048 | 1084 | 776 |
| 4096 | 1564 | 1048 |
| 6144 | 1964 | 1320 |
| 8192 | 2304 | 1593 |
| 10240 | 2604 | 1865 |
| 12288 | 2867 | 2137 |
| 14336 | 3106 | 2409 |
| 16384 | 3325 | 2681 |
| 18432 | 3528 | 2954 |
| 20480 | 3719 | 3226 |
| 22528 | 3901 | 3498 |
| 24576 | 4075 | 3770 |
| 26624 | 4245 | 4042 |
| 28672 | 4411 | 4315 |
| 30720 | 4576 | 4587 |
| 32768 | 4740 | 4859 |
| 34816 | 4907 | 5131 |
| 36864 | 5077 | 5403 |
| 38912 | 5253 | 5676 |
| 40960 | 5437 | 5948 |
| 43008 | 5630 | 6220 |
| 45056 | 5837 | 6492 |
| 47104 | 6058 | 6764 |
| 49152 | 6303 | 7036 |
| 51200 | 6573 | 7309 |
| 53248 | 6878 | 7581 |
| 55296 | 7232 | 7853 |
| 57344 | 7644 | 8125 |
| 59392 | 8143 | 8397 |
| 61440 | 8610 | 8670 |
| 63488 | 8610 | 8942 |

FIG. 2A

AUTOMATIC CALIBRATION OF POSITION TRANSMITTER

CROSS-REFERENCE TO RELATED APPLICATIONS

This patent application claims benefit to the filing date of U.S. Patent Application Ser. No. 62/239,829, filed Oct. 9, 2015; the entire disclosure of which is hereby incorporated herein.

BACKGROUND

In a process control system, a valve controller may perform one or more functions relating to the position of a valve, such as moving a valve into a position, transmitting the position of the valve, and/or transmitting an alert related to the position of the valve. One or more instrument devices of the valve control system may receive or provide electrical signals for moving the valve and/or monitoring the position of the valve. For example, a position controller may drive a signal for moving the valve to a particular position, whereas a transmitter may transmit a signal that includes information related to the position of the valve. To maintain the operating quality of the process control system, instrument devices utilized to perform the functions of the process are calibrated to ensure accuracy and reliability. During calibration of any of the instrument devices, the operation of a valve controller may need to be suspended, which may ultimately affect the process control system. Accordingly, it is desired to minimize the amount of time involved to calibrate the valve controller without adversely affecting the process control system.

SUMMARY

One aspect of the invention is directed to a system, method, or device for controlling a valve where calibration aspects of one or more instrument devices implemented in a valve controller are utilized to ensure the operating performance of at least one other instrument device. More specifically, calibration aspects of a position controller may be utilized with a transmitter, thereby removing the need to separately calibrate both the position controller and the transmitter.

A further aspect of the invention includes utilizing a dual-powered transmitter that ensures power to the transmitter when either or both of the position controller or the transmitter are powered.

In another aspect of the invention, the transmitter implements a limit switch function that includes a switchpoint threshold for designating between two output states of the transmitter.

In one embodiment of the invention, a valve controller for controlling a valve comprises: a position controller coupled to the valve and capable of driving a valve control value to the valve to move the valve to a known position, such as a physical travel limit(s), for example, fully open or fully closed. The position controller includes a position controller processor and a position controller memory; a transmitter coupled to the position controller via a communication link, the transmitter including a transmitter processor and a transmitter memory; a valve position sensor operatively coupled to the valve, the position controller, and the transmitter, wherein the valve position sensor provides a valve position sensor value indicating the position of the valve at the physical travel limit(s) in response to the valve control value driven from the position controller to the valve; a calibration table and/or chart including transmitter output values correlated to the valve position sensor values, the calibration table and/or chart generated by the position controller processor executing an algorithm utilizing calibration valve states and calibration valve position sensor values obtained from the valve position sensor in the calibration states driven by the position controller during calibration of the position controller; and a transmitter output signal transmitted from the transmitter, derived from the valve position sensor value.

Another embodiment of the invention is directed to a method of operating a valve controller to control a valve, the valve controller including one or more processors, a memory, and a position controller coupled to the valve, a valve position sensor, and a transmitter. The method includes: calibrating, by the one or more processors, the position controller and obtaining calibration data in response to the calibration of the position controller; generating, by one or more processors, a calibration table and/or chart based on the calibration data of the position controller, the calibration table and/or chart including a transmitter output value correlated to a valve position sensor value; driving, by the one or more processors, a valve control value to move the valve; receiving, by the one or more processors, the valve position sensor values from the valve position sensor in response to the known valve positions; utilizing, by the one or more processors, the calibration table and/or chart and determining the transmitter output value correlated to the valve position sensor value; and transmitting, by the one or more processors, a transmitter output signal including the determined valve position.

In a further embodiment of the invention, a system for controlling a valve comprises: a valve controller including one or more processors, a valve position sensor coupled to the valve and the one or more processors; a transmitter coupled to the valve position sensor and the one or more processors; a position controller coupled to the valve, the valve position sensor, the transmitter, and the one or more processors; and a non-transitory computer-readable memory coupled to the one or more processors, the non-transitory computer-readable memory including instructions stored thereon on that, when executed by the one or more processors, cause the valve controller to: calibrate the position controller and obtain calibration data in response to the calibration of the position controller; generate a calibration table and/or chart based on the calibration data of the position controller, wherein the calibration table and/or chart includes a transmitter output value correlated to a valve position sensor value; drive a valve control value to move the valve; receive the valve position sensor value from the valve position sensor; utilize the calibration table and/or chart and determine the transmitter output value correlated to the received valve position sensor value; and transmit a transmitter output signal including the determined valve position value.

A further embodiment of the invention includes a non-transitory computer-readable medium including instructions stored on a memory of a system for controlling a valve, the system comprising a valve controller including one or more processors, a valve position sensor coupled to the valve and the one or more processors; a transmitter coupled to the valve position sensor and the one or more processors; a position controller coupled to the valve, the valve position sensor, the transmitter, and the one or more processors; and a non-transitory computer-readable memory coupled to the one or more processors, wherein the instruction when executed by the one or more processors, cause the system to: calibrate the position controller and obtain calibration data in response to the calibration of the position controller; generate a calibration table and/or chart based on the calibration data of the position controller wherein the calibration table and/or chart includes transmitter output values correlated to valve position sensor values; move the valve to a position; receive valve position sensor value from the valve position sensor; utilize the calibration table and/or chart and determine a transmitter output value based on the received valve position sensor value; and transmit a transmitter output signal including the determined transmitter output value.

Many of the inventive principles and much of the inventive functionality may also be implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, is limited to the essentials with respect to the principles and concepts of the described embodiments.

BRIEF DESCRIPTION OF THE DRAWINGS

FIG. 1 is a block diagram of a partial process control system including an example valve controller described herein;

FIG. 2A is an illustration of an example calibration table as described herein;

DETAILED DESCRIPTION

Figure 2B:
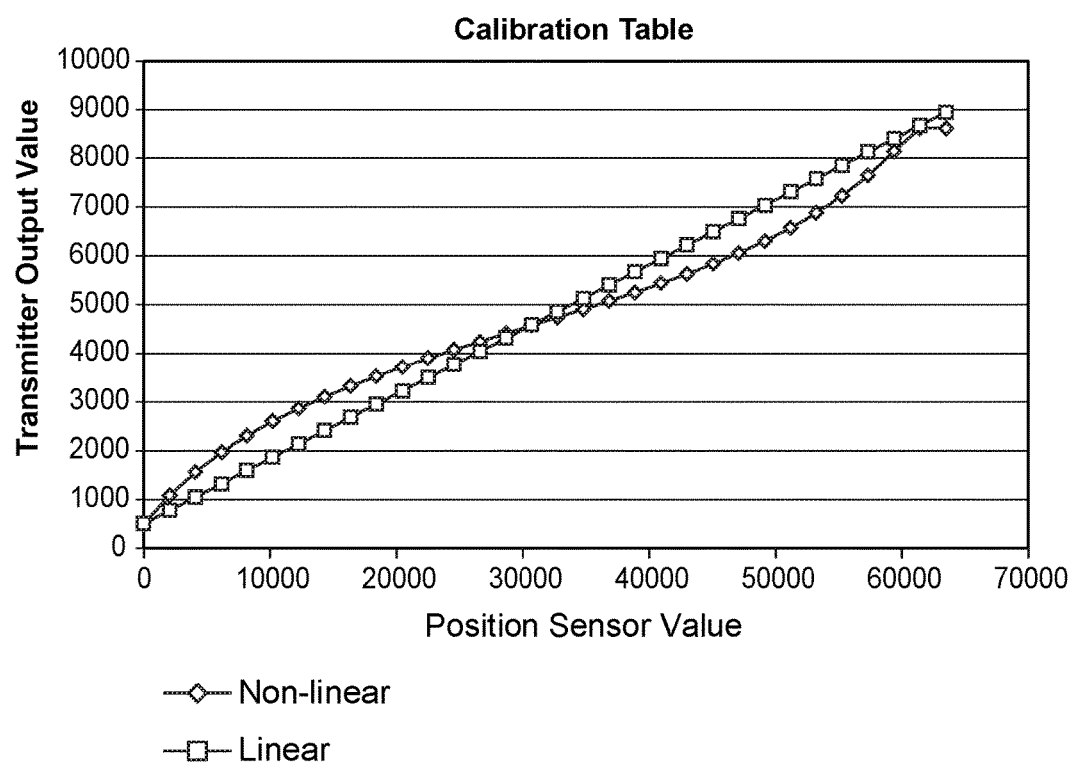
FIG. 2B is an illustration of an example calibration chart as described herein.

A valve controller is typically calibrated for use prior to being put in service in the field. In the course of setting up or operating the valve controller, one or more functions of the valve controller may require re-calibration, such as, input/output signals and valve travel. During calibration of the valve controller, a position controller may drive a calibration valve control signal to move the valve to a desired state and monitor the resulting position of the valve via a valve position sensor or travel sensor. For example, the calibration valve control signal may move the valve to a fully open position and/or a fully closed position. The valve position sensor or travel sensor, which is coupled to the valve, obtains a calibration valve position sensor value that is indicative of the valve's position. More specifically, the position sensor obtains the calibration valve position sensor value corresponding to the valve position that resulted in response to the driven calibration state. The valve controller, for example, the position controller, generates a calibration table and/or chart based on, at least, the calibration data, for example, the corresponding pair(s) of calibration valve positions and calibration valve position sensor values. Additional aspects may be considered with the calibration data to generate the calibration table and/or chart, for example, valve configuration.

During normal operation of the valve, the valve controller utilizes the calibration table and/or chart to determine a transmitter output value. In particular, the transmitter utilizes the calibration table and/or chart to determine a transmitter output value that corresponds to the valve position sensor value that is obtained by the valve position sensor in response to the actual position of the valve. The transmitter output value is based on the corresponding valve position sensor value of the calibration table and/or chart. In this manner, the transmitter utilizes calibration data of the position controller to ensure the accuracy of the transmitter output value that is eventually transmitted by the transmitter without needing to separately calibrate the transmitter.

FIG. 1 is a block diagram of a portion of a process control system or network 100 for controlling a valve 102 and configured in accordance with one example embodiment of the present invention described herein. A valve controller 104 includes a position controller 106 coupled via a communication link (line or bus 110) to a transmitter 108. The valve controller 104 may support a variety of valve control signals, such as 4-20 mA current loop (4-20 mA) control signal that is well known in the industry. The valve controller 104 may use the 4-20 mA control signal to control the position of the valve 102. In addition to the 4-20 mA control signal, a Highway Addressable Remote Transducer (HART™) protocol signal may be superimposed on the control input signals to allow diagnostic, maintenance, and additional process data to be communicated to the valve controller 104 via a HART signaling interface. Further, as is known in process control systems, pneumatic control may be implemented to conduct movement of an actuator, which may ultimately cause corresponding movement of a valve disk or other flow control mechanism. For example, a pneumatic control may be used to regulate the flow of pressurized fluid, such as a gas, from a pneumatic input to a pneumatic output. Some embodiments may use a second pneumatic output depending on the type of valve being controlled. For example, some valves implement a single pressure input to move a valve actuator that has a spring or other return mechanism.

The position controller 106 includes a computing device 114 and a memory device 116. The transmitter 108 includes a computing device 118 and a memory device 120. Each of the computing devices 114, 118 may include one or more processors or microprocessors and each processor may be an ASIC circuit, a microcomputer, or another hardware/firmware device capable of performing sequential steps or routines to accomplish the functions of the valve controller 104. Each of the memory devices 116, 120 of the valve controller 104 may include any type or combination of memory devices commonly used in a valve control system, for example, volatile, non-volatile, and/or portable memory devices.

A valve position sensor 112 is coupled to the valve 102, the position controller 106, and the transmitter 108. The sensor 112 generally provides information about the position of the valve to the position controller 106 and the transmitter 108. The transmitter 108 is capable of transmitting the valve position information to the process control system 100 via wired and/or wireless communication.

During calibration, the position controller 106 drives the valve 102 to a particular known position or state, such as a physical limit, for example, fully open or fully closed. The sensor 112 provides feedback to the position controller 106 as to the position of the valve 102, for example, a calibration valve position sensor value that is associated with the known position of the valve 102.

Calibration data of the valve controller 104 includes the corresponding pair of the known calibration valve position and the resulting calibration valve position sensor value. One or more processors of the valve controller 104 generates a calibration table and/or chart 122 based on the corresponding pair of calibration valve position and resulting calibration valve position sensor value. Additional aspects or characteristics of the valve during calibration, for example, linear or rotational characteristics of the valve, may also be utilized in the generation of the calibration table and/or chart 122. The calibration table and/or chart 122 includes a transmitter output value correlated to the valve position sensor value and may be stored in one or more of the memory devices 116, 120 of the position controller 106 and/or the transmitter 108. Any portion of the calibration table and/or chart 122 may be automatically or periodically transmitted from the position controller 106 to the transmitter 108 via the communication link 110, where a copy of the calibration table and/or chart 122 may be stored in the memory 120 of the transmitter 108.

During normal operation of the valve controller 104, the transmitter 108 utilizes the calibration table and/or chart 122 during the determination or generation of the transmitter output value. For example, upon receiving a valve position sensor value from the valve position sensor 112, the processor 118 of the transmitter 108 utilizes the calibration table and/or chart 122 to determine and/or generate a correlating transmitter output value that accurately reflects the position of the valve 102. In particular, the processor 118 of the transmitter 108 utilizes the calibration table and/or chart 122 to determine the transmitter output value that corresponds to the valve position sensor value obtained by the valve position sensor 112. In other words, the valve position value to be included with a transmitter output signal and transmitted from the transmitter 108 is a result of a digital transformation from the valve position sensor value to the transmitter output value using the interpolation of the calibration table and/or chart 122. The calibration table and/or chart 122 may account for various configurations (e.g., linear and nonlinear) of the valve 102; for example, when the valve position sensor 112 is a rotary potentiometer on a sliding stem valve and linearization is generally required. A valve controller configured in this manner provides for the generally more capable software of the position controller 106 to manage, maintain, and/or coordinate the calibration and linearization of the transmitter 108 at the same time as it manages, maintains, and/or coordinates its own calibration and linearization. Such management and/or coordination of the calibration and linearization of both the position controller 106 and the transmitter 108 allows for the valve controller 104 to be administered by a single user interface and significantly simplifies the hardware and software of the transmitter 108 by removing the need to separately calibrate the transmitter 108.

Some examples of the calibration table and chart 122 that may be used to facilitate conversion of raw values of the valve position sensor value received from the valve position sensor 112 to raw values for the transmitter output value are shown in FIGS. 2A and 2B. In the calibration table shown in FIG. 2A, the columns include corresponding index values (for example, valve position sensor values and transmitter output values (non-linear and linear) derived from the calibration data, which may include the configuration aspects of the valve. The calibration chart shown in FIG. 2B is a graphical representation of the index values depicted in the calibration table shown in FIG. 2A and includes axes designating valve position sensor position values (horizontal axis) and transmitter output values (vertical axis), e.g., pulse-width modulation duty values (vertical axis). Thus, during normal operation of the valve controller 104, the transmitter 108 utilizes the valve position sensor value that is obtained from the valve position sensor 112 with the calibration table and/or chart 122 to determine the corresponding transmitter output signal. The transmitter output signal may be in the form of a pulse-width modulation value for either linear or non-linear configurations of the valve controller 104. The pulse-width modulation value may then be included with a valve position signal to be transmitted by the transmitter 108 to another portion of the process control system 100.

Figure 3:
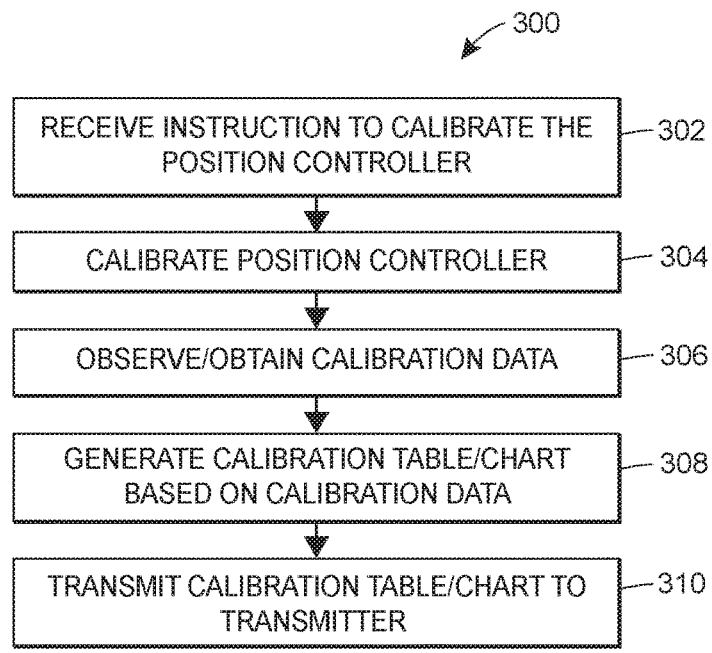
FIG. 3 is a flow diagram of an example method for providing a calibration table and/or chart as described herein.

FIG. 3 is a flow diagram of an example method 300 relating to generation of the calibration table and/or chart based on calibration data of the valve controller 104 shown in FIG. 1. At block 302, a control signal is received at the valve controller 104 to calibrate the position controller 106. At block 304, the position controller is calibrated. In some calibration routines, a sequence of calibration valve control signals are driven from the position controller 106 to move the valve 102 into multiple positions. Each calibration valve control signal drives the valve to a known valve position, for example, fully-open, fully-closed. At block 306, the valve position sensor 112 monitors the position of the valve 102 and obtains or detects a calibration valve position sensor value for each calibration valve control position attained during the calibration routine. In addition to the calibration valve positions and the resulting calibration valve position sensor values, the calibration data may also include aspects of the value configuration, for example, linear or rotational characteristics of the valve. The calibration data may be stored in the memory of the valve controller 104.

At block 308, one or more processors of the valve controller generates the calibration table and/or chart based on the calibration data. For example, the one or more processors of the position controller 106 may utilize the corresponding pair(s) of calibration valve position(s) and associated calibration valve position sensor value(s) obtained during calibration of the position controller 106 to calculate a correlated transmitter output value(s). During normal operation of the valve controller, the one or more processors of the transmitter 108 may utilize the calibration table and/or chart to determine the transmitter output value(s) that correlates to the valve position sensor value(s). The transmitter output value is the result of a digital transformation using interpolation of the calibration table and/or chart that resides within the memory of valve controller 104.

At block 310, the calibration table and/or chart is made accessible to the transmitter 108. For example, the calibration table and/or chart may be transmitted from the position controller 106 to the transmitter 108 via the communication link (line or bus), where it is later utilized by the transmitter 108 during normal operation of the valve controller to determine or calculate a transmitter output value that is representative of the position of the valve 102. The calibration table and/or chart generated by one or more processors executing an algorithm utilizing the corresponding pair(s) of valve position and valve position sensor value is preferably transmitted automatically by the computing device (e.g., one or more processors) of the position controller 106 to the transmitter 108 upon completion of the calibration of the position controller 106. Example embodiments of the calibration table and/or chart transmitted from the position controller 106 are shown in the calibration table of FIG. 2A and the calibration chart of FIG. 2B, both of which may be updated upon calibration of the position controller 106 and stored in the memory 116 of the position controller 106 and/or the transmitter 108.

This manner of coordinating the calibration and linearization of both the position controller function and the transmitter function allows the valve control process to be managed by a single user interface and allows for the hardware and software of the transmitter processor to be simplified. More specifically, the ability for the position controller 106 of the valve controller 104 to generate the calibration table and/or chart based on the calibration data of the position controller 106, wherein the transmitter 108 of the valve controller 104 utilizes the calibration table and/or chart to determine an accurate transmitter output value, allows the valve controller 104 to forgo a separate calibration routine for the transmitter 108, which may lessen the amount of time the valve controller 104 may be unavailable for operation.

Referring again to FIG. 1, one embodiment of the valve controller 104 includes a galvanic isolator 124 operatively coupled between the transmitter 108 and the process control system 100, wherein the flow of electrical current therebetween is prevented. The galvanic isolator 124 is an effective component for breaking ground loops and preventing unwanted electrical current from flowing to the valve controller 104 when sharing an electrical ground. Although a direct conduction path between the transmitter 108 and the process control system 100 is not permitted by the galvanic isolator 124, energy or information is able to be exchanged therebetween by other means, such as capacitance, induction or electromagnetic waves, or by optical, acoustic, or mechanical means. Some example embodiments of the galvanic isolator 124 include a capacitor, transformer, and opto-isolator.

In another embodiment of the valve controller 104, analog-to-digital and digital-to-analog circuitry 126 may be implemented to facilitate the digital transformation of the valve position sensor value to the transmitter output value. It is to be understood that any known technology for implementing the analog-to-digital and digital-to-analog circuitry 126 may be incorporated into the position controller 106 and the transmitter 108. Additionally, input/output (I/O) circuitry 128 may be implemented to facilitate communication between the valve controller 104 (for example, position controller 106, transmitter 108) and the other devices of the process control system 100 (for example, valve 102, sensor 112). Any known technology for implementing the I/O circuitry 128 may be incorporated into the valve controller 104, for example, pulse-width modulation (PWM) or pulse-duration modulation (PDM) may be implemented to facilitate control of the transmitter output signal ultimately transmitted by the transmitter 108. The pulse modulated signal is capable of being passed from the transmitter 108 across the galvanic isolator 124 and to the process control system 100. The pulse modulated signal may be used to control the output current using circuitry components that are sufficiently stable wherein recalibration of the 4-20 mA output portion of the valve controller 104 is generally not necessary.

In another aspect of the valve controller 104, configuration via any one or combination of a physical switch, an auxiliary input, or software, may be utilized to select a first operating mode wherein the transmitter 108 provides an analog output signal that represents a position of the valve 102. Alternatively, the configuration may provide a second operating mode wherein the transmitter 108 may provide a switch-type functionality where the output signal represents a valve state, status, or condition with respect to a predetermined threshold value. The threshold value may be set to distinguish the valve position among two conditions or states; for example, a fully-open valve position and a not fully-opened valve position, or a fully-closed valve position and a not fully-closed valve position. Additionally, the threshold value may be set as a percentage of a fully-open valve position; for example, more than 50% open or less than 50% open. The threshold value, which may be utilized to detect the transition of the valve position from one state to another state, for example, from fully open to not fully open, may be incorporated into an alarm module to alert process control personnel of changing operating states of the valve 102.

Figure 4:
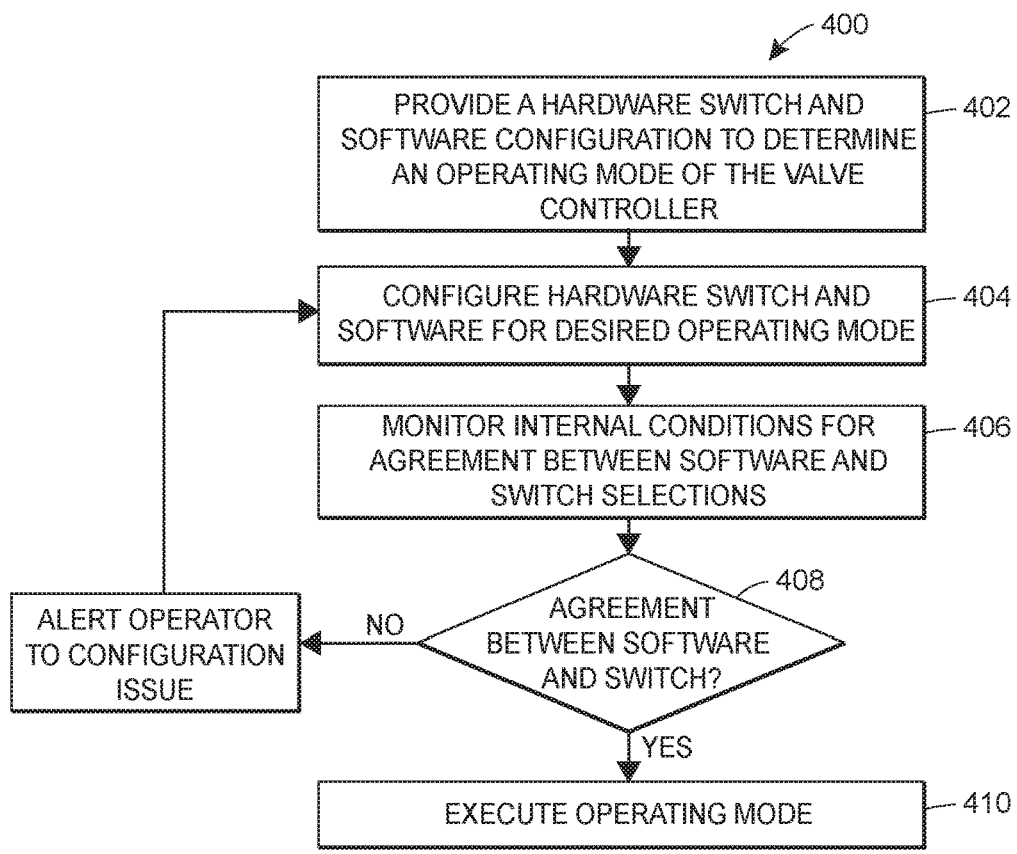
FIG. 4 is a flow diagram of an example method for implementing a selectable function of the valve controller shown FIG. 1.

FIG. 4 is a flow diagram of an example method 400 for providing selectable output modes of the valve controller 104 shown in FIG. 1. At block 402, a hardware switch and software configuration are provided to enable a variety of operating modes of the valve controller, for example, to provide an output indicative of valve position, valve state, etc. At block 404, the switch and software are configured for the desired operating mode. At block 406, the internal conditions, for example the availability of power from the transmitter power supply, are monitored for agreement with the desired operating mode. At block 408, if the switch and software configurations agree, the valve controller implements the desired operating mode at block 410, e.g., valve position, valve state. If there is disagreement, the operator is prompted to correct the configuration.

Figure 5:
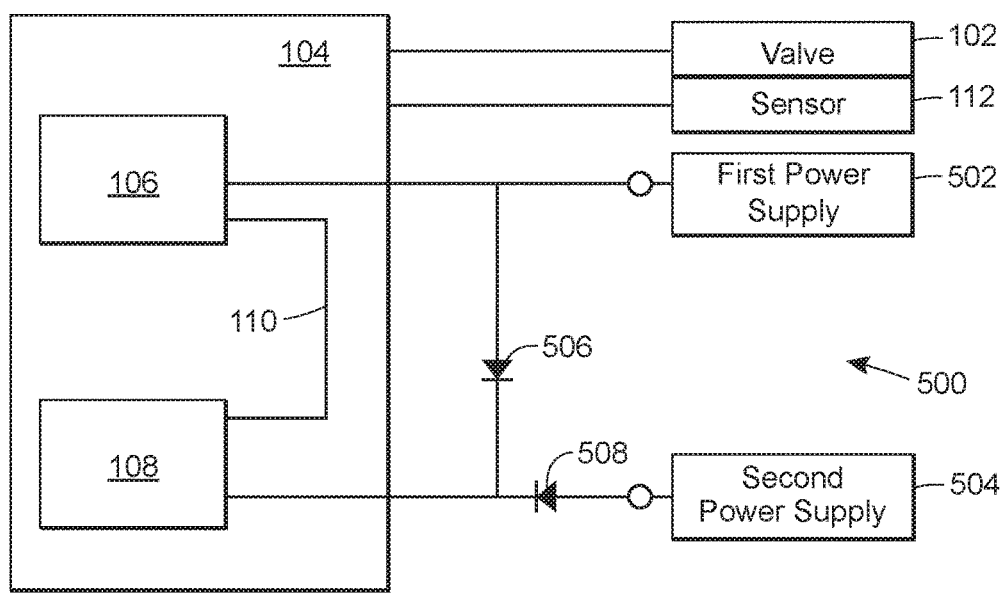
FIG. 5 is block diagram of an example embodiment of a dual-power configuration for the transmitter of the valve controller as described herein.

In another embodiment of the valve controller 104, the transmitter 108 is dual-powered and configured to receive power when either or both the position controller 106 and the transmitter 108 are powered. An example configuration of a dual-power circuitry 500 for implementation with the valve controller 104 is shown in FIG. 5. The dual-power circuitry 500 ensures that the transmitter 108 is able to receive or obtain the calibration table and/or chart from the position controller 106. More specifically, a first power source 502 is coupled to the position controller 106 and the transmitter 108 and a second power source 504 is coupled to the transmitter 108. Utilizing the first power source 502 to supply power to both the position controller 106 and the transmitter 108 enables the transmitter 108 to be powered at a time when the position controller 106 may send the calibration table/chart to the transmitter 108. In the example embodiment of the dual-power circuitry shown in FIG. 5, a diode circuit 500 including a pair of diodes 506, 508, are operatively coupled to the first power supply 502, the second power supply 504, the position controller 106, and the transmitter 108. If power is not being supplied to the transmitter 108 by the second power supply 504, for example, during an initial set-up of the process system when the transmitter 108 may not be in operation, the diode circuitry will ensure that the power from the first power supply 502 will be provided to the transmitter 108.

The applications and benefits of the systems, methods, and techniques described herein are not limited to only the above examples. Many other applications and benefits are possible by using the systems, methods, and techniques described herein. Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Also, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A valve controller for controlling a valve, the valve controller comprising: a position controller coupled to the valve and capable of driving a valve control signal to the valve to move the valve to a known position such as a physical travel limit(s), for example, fully opened or fully closed; the position controller including a position controller processor and a position controller memory; a transmitter coupled to the position controller via a communication link, the transmitter including a transmitter processor and a transmitter memory; a valve position sensor operatively coupled to the valve, the position controller, and the transmitter, wherein the valve position sensor provides a valve position sensor value indicating the position of the valve in response to the valve control value driven from the position controller to the valve; a calibration table and/or chart including a transmitter output value correlated to the valve position sensor value, the calibration table and/or chart generated by the position controller processor executing an algorithm utilizing a calibration valve position during calibration of the position controller and a calibration valve position sensor value obtained from the valve position sensor in response to the calibration valve position during calibration of the position controller; and a transmitter output signal transmitted from the transmitter, the transmitter output signal including the transmitter output value.

Aspect 2: The valve controller of Aspect 1, wherein the calibration table and/or chart is stored in the position controller memory.

Aspect 3: The valve controller of any combination of Aspects 1 and 2, wherein the calibration table and/or chart is automatically transmitted to the transmitter upon completion of a modification to the calibration data.

Aspect 4: The valve controller of any combination of Aspects 1 to 3, wherein the calibration table and/or chart is stored in the transmitter memory.

Aspect 5: The valve controller of any combination of Aspects 1 to 4, further comprising at least one selectable output mode.

Aspect 6: The valve controller of any combination of Aspects 1 to 5, further comprising a first output mode, wherein the transmitter output signal represents a valve position.

Aspect 7: The valve controller of any combination of Aspects 1 to 6, further comprising a second output mode, wherein the transmitter or switch output signal represents a state of the valve position defined in relation to a valve position threshold level.

Aspect 8: The valve controller of any combination of Aspects 1 to 7, further comprising a galvanic isolator coupled between the transmitter and a system network.

Aspect 9: The valve controller of any combination of Aspects 1 to 8, further comprising a power supply circuit coupled to the valve controller including a pair of electrically separate power sources, the pair of electrically separate power sources including a first power source capable of providing power to the position controller and the transmitter, and a second power source capable of providing power to the transmitter, wherein the power supply circuit is configured to provide power to the transmitter via the first power source when the second power source fails to provide power to the transmitter.

Aspect 10: The valve controller of any combination of Aspects 1 to 9, wherein the power supply circuit includes a diode circuit, wherein a pair of diodes is coupled to the position controller, the transmitter, the first power source, and the second power source.

Aspect 11: A method of operating a valve controller to control a valve, the valve controller including one or more processors, a memory, and a position controller coupled to the valve, a valve position sensor, and a transmitter, the method comprising: calibrating, by the one or more processors, the position controller and obtaining calibration data in response to the calibration of the position controller; generating, by one or more processors, a calibration table and/or chart based on the calibration data of the position controller, the calibration table and/or chart including a valve position value correlated to a valve position sensor value; driving, by the one or more processors, a calibration valve control signal to the valve; receiving, by the one or more processors, the valve position sensor value from the valve position sensor in response to the driven calibration valve control signal; utilizing, by the one or more processors, the calibration table and/or chart and determining the transmitter output value correlated to the valve position sensor value; and transmitting, by the one or more processors, a transmitter output signal including the determined valve position.

Aspect 12: The method of Aspect 11, wherein generating the calibration table and/or chart includes executing an algorithm utilizing the calibration data of the position controller to determine the transmitter output value based on a calibration valve position and a calibration valve position sensor value obtained from the valve position sensor in response to the calibration valve control signal driven by the position controller during calibration of the position controller.

Aspect 13: The method of any combination of Aspects 11 and 12, wherein determining a transmitter output value includes utilizing the calibration table and/or chart to identify the transmitter output value associated with the valve position sensor value.

Aspect 14: A system for controlling a valve, the system comprising a valve controller including: one or more processors, a valve position sensor coupled to the valve and the one or more processors; a transmitter coupled to the valve position sensor and the one or more processors; a position controller coupled to the valve, the valve position sensor, the transmitter, and the one or more processors; and a non-transitory computer-readable memory coupled to the one or more processors, the non-transitory computer-readable memory including instructions stored thereon on that, when executed by the one or more processors, cause the valve controller to: calibrate the position controller and obtain calibration data in response to the calibration of the position controller; generate a calibration table and/or chart based on the calibration data of the position controller; transmit a valve control value to the valve; receive a valve position sensor value from the valve position sensor; utilize the calibration table and/or chart and determine a transmitter output value based on the valve position sensor value; and transmit a transmitter output signal including the determined valve position value.

Aspect 15: The system of Aspect 14, further comprising a calibration table and/or chart stored on the memory and including the transmitter output value corresponding to the position sensor value, the calibration table and/or chart generated by the one or more processors executing an algorithm to determine the transmitter output value, wherein the algorithm utilizes a calibration valve positioned attained during calibration of the position controller and a calibration position sensor value obtained from the valve position sensor in response to the calibration valve position during calibration of the position controller.

Aspect 16: A non-transitory computer-readable medium including instructions stored on a memory of a system for controlling a valve, the system comprising a valve controller including one or more processors, a valve position sensor coupled to the valve and the one or more processors; a transmitter coupled to the valve position sensor and the one or more processors; a position controller coupled to the valve, the valve position sensor, the transmitter, and the one or more processors; and a non-transitory computer-readable memory coupled to the one or more processors, wherein the instructions when executed by the one or more processors, cause the system to: calibrate the position controller and obtain calibration data in response to the calibration of the position controller; generate a calibration table and/or chart based on the calibration data of the position controller wherein the calibration table and/or chart includes a transmitter output value correlated to a valve position sensor value; drive a valve control value to the valve; receive a valve position value from the valve position sensor in response to the valve position; utilize the calibration table and/or chart and determine a transmitter output value based on the valve position sensor value; and transmit a transmitter output signal including the determined valve position value.

Aspect 17: The non-transitory computer-readable medium of Aspect 16, wherein the calibration table and/or chart stored on the memory and generated by the one or more processors executing an algorithm utilizing a calibration valve position attained during calibration of the position controller and a calibration valve position sensor value obtained from the valve position sensor in response to the calibration valve control signal driven by the position controller during calibration of the position controller.

What is claimed is:

1. A valve controller for controlling a valve, the valve controller comprising:
   a position controller coupled to the valve and capable of driving the valve to a known position, the position controller including a position controller processor and a position controller memory;
   a transmitter coupled to the position controller via a communication link, the transmitter including a transmitter processor and a transmitter memory;
   a valve position sensor operatively coupled to the valve, the position controller, and the transmitter, wherein the valve position sensor provides a valve position sensor value indicating the position of the valve;
   a calibration table and/or chart including a correlation of a transmitter output value to the valve position sensor value, the correlation generated by the position controller processor executing an algorithm utilizing a calibration valve position sensor value attained by the valve position sensor during a calibration of the position controller in response to a calibration valve control signal driven by the position controller to initiate the calibration of the position controller; and
   a transmitter output signal transmitted from the transmitter based on the valve position sensor value, the transmitter output signal including the transmitter output value correlated with the valve position sensor value in the calibration table and/or chart.

2. The valve controller of claim 1, wherein the calibration table and/or chart is stored in the position controller memory.

3. The valve controller of claim 2, wherein the calibration table and/or chart is automatically transmitted to the transmitter upon completion of the calibration of the position controller.

4. The valve controller of claim 1, wherein the calibration table and/or chart is stored on the transmitter memory.

5. The valve controller of claim 1, comprising a transmitter with at least one selectable output mode.

6. The valve controller of claim 5, comprising a first output mode, wherein the transmitter output signal represents a valve position.

7. The valve controller of claim 6, comprising a second output mode, wherein the transmitter output signal represents a state of the valve position defined in relation to a valve position threshold level.

8. The valve controller of claim 5, comprising a transmitter output mode, wherein the transmitter output signal represents a state of the valve position defined in relation to a valve position threshold level.

9. The valve controller of claim 1, further comprising a galvanic isolator coupled between the transmitter and a system network.

10. The valve controller of claim 1, further comprising:
    a power supply circuit coupled to the valve controller including a pair of electrically separate power sources, the pair of electrically separate power sources including a first power source capable of providing power to the position controller and the transmitter, and a second power source capable of providing power to the transmitter.

11. The valve controller of claim 10, wherein the power supply circuit includes a diode circuit including a pair of diodes coupled to the position controller, the transmitter, the first power source, and the second power source.

12. A method of operating a valve controller to control a valve, the valve controller including one or more processors, a memory, and a position controller coupled to the valve, a valve position sensor, and a transmitter, the method comprising:
- calibrating, by the one or more processors, the position controller and obtaining calibration data in response to the calibration of the position controller;
- generating, by the one or more processors, a calibration table and/or chart based on the calibration data of the position controller, the calibration table and/or chart including a transmitter output value correlated to a valve position sensor value based on a calibration valve position sensor value attained by the valve position sensor during a calibration of the position controller;
- driving, by the one or more processors, a valve control value to the valve;
- receiving, by the one or more processors, the valve position sensor value from the valve position sensor, the valve position sensor value representative of the valve position;
- utilizing, by the one or more processors, the calibration table and/or chart and determining the transmitter output value correlated to the valve position sensor value; and
- transmitting, by the one or more processors, a transmitter output signal based on the valve position sensor value, the transmitter output signal including the transmitter output value correlated with the valve position sensor value in the calibration table and/or chart.

13. The method of claim 12, wherein generating the calibration table and/or chart includes executing an algorithm utilizing valve position sensor value obtained from the valve position sensor and the valve position attained when calibration valve control signals were driven by the position controller during calibration of the position controller.

14. A system for controlling a valve, the system comprising:
- a valve controller including:
- one or more processors,
- a valve position sensor coupled to the valve and the one or more processors;
- a transmitter coupled to the valve position sensor and the one or more processors;
- a position controller coupled to the valve, the valve position sensor, the transmitter, and the one or more processors; and
- a non-transitory computer-readable memory coupled to the one or more processors, the non-transitory computer-readable memory including instructions stored thereon that, when executed by the one or more processors, cause the valve controller to:
  - calibrate the position controller, in response to a calibration valve control signal driven by the position controller, and obtain calibration data in response to the calibration of the position controller;
  - generate a calibration table and/or chart based on the calibration data of the position controller, wherein the calibration table and/or chart stored on the non-transitory computer-readable memory and includes a transmitter output value correlated to a valve position sensor value, the correlation based on a calibration valve position sensor value attained by the valve position sensor during a calibration of the position controller in response to a calibration valve control signal driven by the position controller to initiate the calibration of the position controller;
  - drive a valve control signal to the valve;
  - receive the valve position sensor value from the valve position sensor in response to the valve position attained when the valve control value is driven to the valve;
  - utilize the calibration table and/or chart and determine the transmitter output value correlated to the valve position sensor value; and
  - transmit a transmitter output signal based on the valve position sensor value, the transmitter output signal including the transmitter output value correlated with the valve position sensor value in the calibration table and/or chart.

15. A non-transitory computer-readable medium including instructions stored on a memory of a system for controlling a valve, the system comprising a valve controller including one or more processors, a valve position sensor coupled to the valve and the one or more processors; a transmitter coupled to the valve position sensor and the one or more processors; a position controller coupled to the valve, the valve position sensor, the transmitter, and the one or more processors; and a non-transitory computer-readable memory coupled to the one or more processors, wherein the instructions when executed by the one or more processors, cause the system to:
- drive a calibration valve control signal to calibrate the position controller and obtain calibration data in response to the calibration of the position controller;
- generate a calibration table and/or chart based on the calibration data of the position controller wherein the calibration table and/or chart includes a transmitter output value correlated to a valve position sensor value;
- drive a valve control signal to the valve;
- receive a valve position sensor value from the valve position sensor in response to the position attained with the valve control signal driven to the valve;
- utilize the calibration table and/or chart and determine a transmitter output value based on the valve position sensor value; and
- transmit a transmitter output signal based on the valve position sensor value, the transmitter output signal including the transmitter output value correlated with the valve position sensor value in the calibration table and/or chart.

* * * * *